(No Model.)
A. C. EVANS
HARROW.
No. 248,850. Patented Nov. 1, 1881.
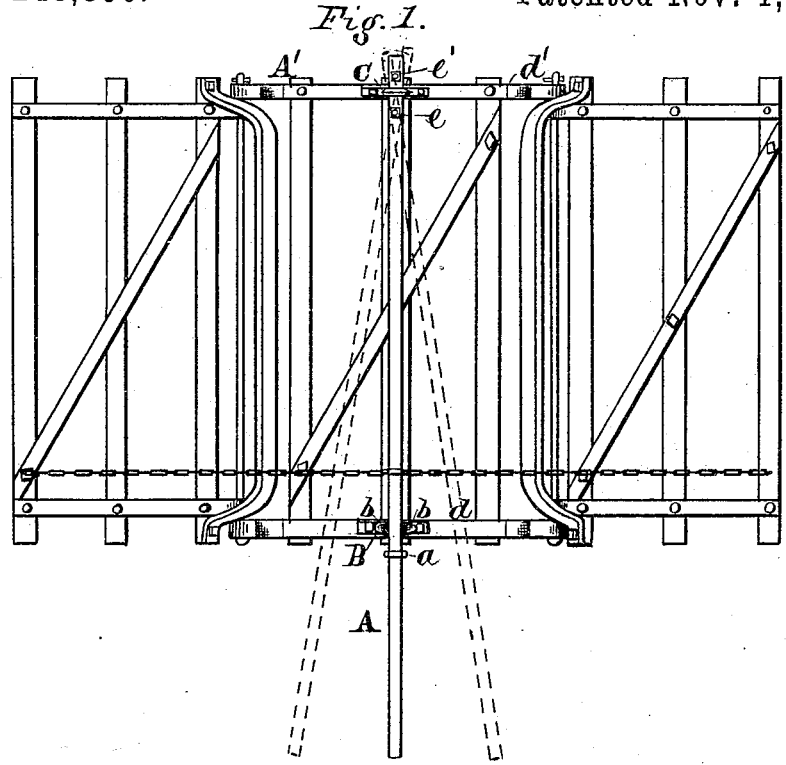
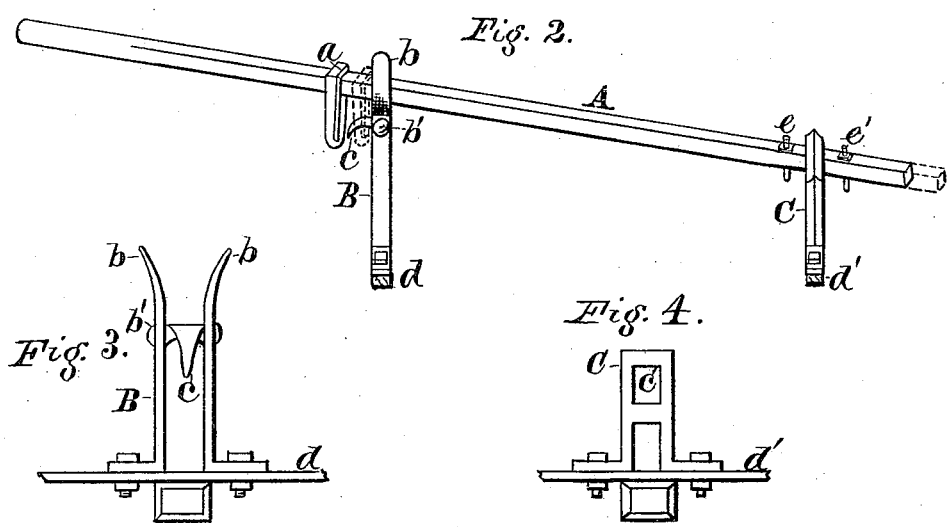

UNITED STATES PATENT OFFICE.

AUSTIN C. EVANS, OF SPRINGFIELD, OHIO.

HARROW.

SPECIFICATION forming part of Letters Patent No. 248,850, dated November 1, 1881.

Application filed January 8, 1881. (No model.)

*To all whom it may concern:*

Be it known that I, AUSTIN C. EVANS, of the city of Springfield, in the county of Clarke and State of Ohio, have invented a new and useful Improvement in Harrows, of which the following is a full, clear, and exact specification, reference being had to the accompanying drawings, forming a part of the same.

My invention relates to that class of harrows in which the sections are hinged together and provided with a lever and chains extending therefrom to the outside sections for the purpose of elevating the latter by a movement of said lever.

The object of my invention is to provide means for raising the front and rear ends of the harrow (by the same lever used for elevating the side sections) in an easier manner, and also for shifting said lever in different directions when operating the harrow, as will be hereinafter more fully explained.

Figure 1 is a top view of a harrow having three sections, to which my improvements are applied. Fig. 2 is a side view of the operative lever and the harrow attachments. Fig. 3 is a rear view of the lever-supporting fork, and Fig. 4 is a front view of the guide by which the operating-lever is attached to the harrow-frame.

In the views, A is the long operative lever, shown in position for operation in elevating the side sections, Fig. 1, and also for raising the ends of the implement. This lever extends from front to rear along the central longitudinal line of the three-section harrow seen in this figure, the rear end being elevated to a sufficient height to make it convenient for the operator and extending beyond the rear of the implement. In the usual forms of construction this lever is pivoted to the front end of the harrow, and at or near the point where the chains are attached to it a hook-lever connects it with the rear of the section over which it is located. In this manner of attaching it its movements are too limited to adapt it to all of the various manipulations required, more especially that of raising the rear end of the implement, which is more often necessary than any other movement in harrowing, as accumulations of grass and weeds reach the rear of the harrow generally before the operator has time to clear it. In this there is a much greater sweep of the lever radially in elevating the side sections, so that the scope of the implement is increased, and the necessity of taking hold of the wing-sections with the hands to disengage them from trash or to fold them is obviated.

B is an open fork, consisting of two pieces of flat bar-iron. They are vertical and parallel from the connecting cross-piece $b'$ down to the foot ends, which are bent outward at right angles and bolted to the rear strap-rail, $d$, connecting the ends of the beams of the middle section, A', of the harrow. Above the cross-piece $b'$ they diverge outward to their extremities, forming an open fork, in which the lever A rests, and from which it can be easily lifted out when shifting it to raise the side sections. The front end of lever A extends through the guideway C on the front strap-rail, $d'$, (which extends across and connects the ends of the beams,) to which C is bolted through its foot-pieces similarly to those of the fork B. The hole $c'$ (see Fig. 4, in which a front view of the guideway is shown) is large enough to allow the end of the lever to play freely therein. To prevent its being withdrawn, bolts $e$ and $e'$ are inserted vertically through it, (a little distance apart,) one on each side of the guideway C. These bolts extend upward and downward from the lever far enough to catch against either side of the guideway. In raising the rear end of the harrow it is pushed forward until the loop or clip $a$, which is fastened on the lever just behind the fork B and hangs below it, catches under the hook $c$, (which is cast upon the cross-piece $b'$ of the fork and curves downward and toward the rear,) when a lift brings up the rear end of the harrow. As this hook-and-loop connection is easily disconnected by a backward pull of lever A, the latter can be easily lifted out of the fork and thrown to either side of it to raise either side section, and as the lever, when not in use, rests upon the cross-piece $b'$ of the fork B, it is sufficiently elevated and at all times convenient for the operator. The fork and a portion of the strap-rail $d$, on which it stands, are illustrated by Figs. 2 and 3 of the annexed drawings. To raise the front end of the harrow, lever A is drawn back until the front bolt, $e'$, touches the guideway C. This brings a greater length of it to the rear of fork B, giving increased leverage and requiring less power to bear it down upon the cross-piece $b'$ of the fork, which in this operation is its fulcrum.

I claim as my improvement—

1. A harrow provided with a lever, A, having a loop or clip, $a$, in combination with a forked support, B, having a hook, $c$, substantially as described.

2. A sectional harrow provided with a forked support, B, having hook $c$, in combination with the lever A, provided with loop $a$, and chains connecting the lever A with the side sections of the harrow, substantially as described, and for the purpose set forth.

3. As an attachment for a harrow, the fork B, adapted to support the operating-lever, and consisting of the side bars, $b\ b$, connected to each other by a cross-piece, $b'$, and provided with angle-pieces at the base and flaring prongs at the upper end, substantially as shown.

4. In a harrow having an operative lever fulcrumed above the plane of the same and adapted to the movements hereinbefore described, the combination, with said lever, of a guideway attached to the front of the section within which said lever is fulcrumed, bolts projecting from either side of said lever for its retention within said guideway, and a loop extending downward from the rear end of said lever for engaging with a hook projecting from a supporting-fork, substantially as specified.

5. In a harrow flexibly connected together and adapted to be operated by a single hand-lever which moves in every direction around the point of rest, a single upright or post rigidly attached at the base, and which terminates in an open fork, to allow said lever to be operated above, around, and upon either side of said post, substantially as described, and for the purpose hereinbefore set forth.

AUSTIN C. EVANS.

Attest:
GEO. G. CLARK,
B. C. CONVERSE.